W. VERBECK.
PHOTOGRAPHIC CAMERA MECHANISM.
APPLICATION FILED MAR. 8, 1898. RENEWED APR. 28, 1903.

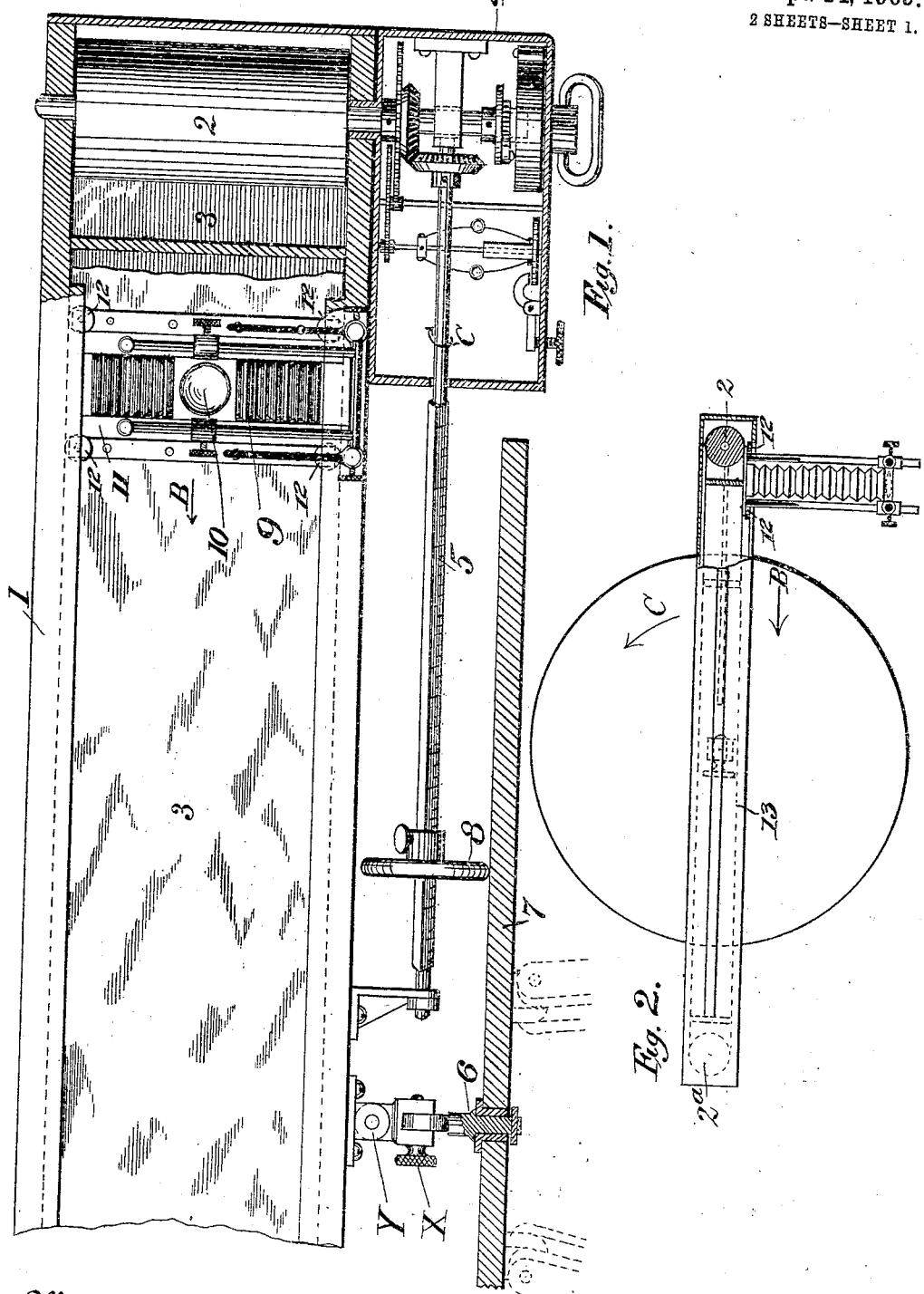

933,801.

Patented Sept. 14, 1909.

2 SHEETS—SHEET 2.

Witnesses
William W. Reaul
C. H. Lanwill.

Inventor
William Verbeck
By his Attorneys
Emley & Rubino

UNITED STATES PATENT OFFICE.

WILLIAM VERBECK, OF MANLIUS, NEW YORK.

PHOTOGRAPHIC-CAMERA MECHANISM.

933,801.  Specification of Letters Patent.  Patented Sept. 14, 1909.

Application filed March 8, 1898, Serial No. 673,088. Renewed April 28, 1903. Serial No. 154,687.

*To all whom it may concern:*

Be it known that I, WILLIAM VERBECK, a citizen of the United States, residing at Manlius, in the county of Onondaga, in the State of New York, have invented certain new and useful Improvements in Photographic-Camera Mechanism, of which the following is a specification, reference being had to the drawings accompanying and forming a part of the same.

The present improvements relate to panoramic photographic cameras which employ substantially flat sensitized plates.

The essential object of the invention is to produce an operating mechanism for panoramic cameras which will expose successive portions of the surface of the sensitive plate at a substantially uniform rate of speed and impart movement to the camera proportional to the focal length of the lens.

A further object of my invention is to produce an improved form of support for photographic panoramic apparatus by the use of which the camera may be set into any position without interfering with the operating mechanism and may be tilted so as to take panoramic pictures of objects above or below the plane of the instrument.

Figure 3:
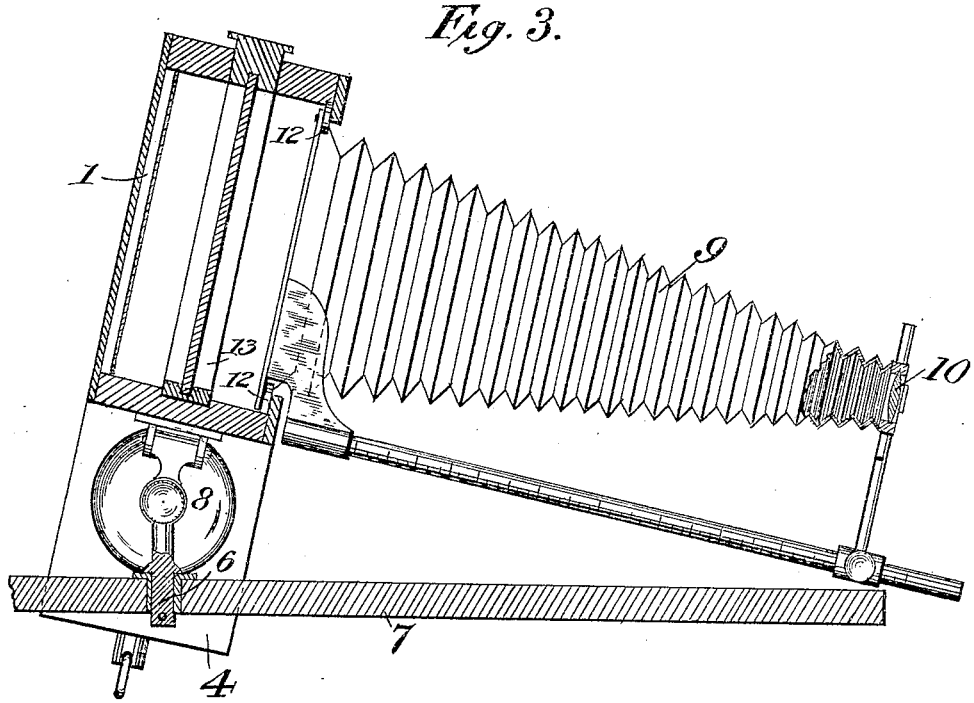
Figure 4:
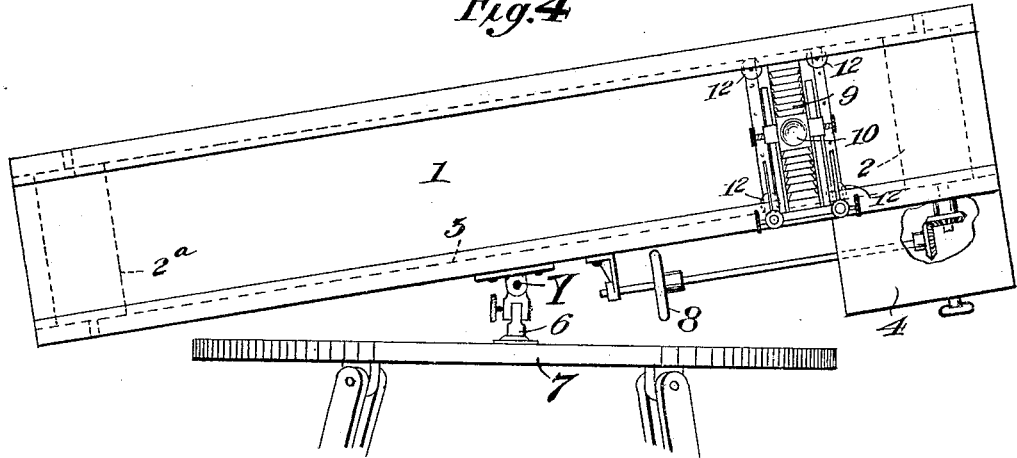

Referring to the drawings in which similar reference characters indicate corresponding parts in all the figures Figure 1 is an elevation partly in section of an apparatus embodying my invention. Fig. 2 is a plan view thereof on a reduced scale. Fig. 3 is a side elevation of the apparatus with the camera tilted forward by means of the joint X in the support showing the plate box and base in section and the bellows and supporting pivot in partial section. Fig. 4 is a front elevation of the entire apparatus showing the camera tilted on the joint Y so as to take the traction wheel off the base or tripod head.

Referring to these features in detail, 1 represents an elongated box supported on the base 7 by the pivot 6 and designed to hold a sensitive plate or plate-holder 13: in each end of said box is placed a roller, 2 and 2ª, and around said rollers there is passed a flexible curtain or shield 3. The ends of this curtain 3 are preferably joined to a plate 11 having a slot or opening through which the plate 13 is exposed and having rollers 12 to secure easy motion. To this plate is attached the bellows 9 carrying the lens 10 in line with said slot in the plate. A suitably governed motor, such as shown in box 4, which is suitably secured to the plate box 1 and connected with the axis of the roller 2 operates to revolve said roller so as to propel the curtain 3 in the direction indicated by arrow B.

Underneath the box 1 and suitably supported thereon is a shaft 5 which is operatively connected with the shaft of roller 2, as by miter gears, for the purpose of being driven by the motor in the direction of the arrow C as shown in Fig. 1. On the shaft 5 is placed a traction wheel 8 which is adjustable on said shaft to and from the pivot 6 and which bears upon the base or tripod head 7.

When in operation the curtain 3 and the plate 11 carrying the bellows and lens, traverse the sensitized surface, uniformly and regularly exposing successive portions of the plate, and the camera box is angularly moved around the pivot 6 by means of the traction wheel 8 traversing the base so that all objects lying within the limits of the angle of movement of the camera and in front of the camera, are successively exposed to the plate. The wheel 8 is preferably made of the same diameter as the drum 2 and the wheel 8 is adjusted to a position on the shaft 5 equal in distance from the pivot 6 to the distance from the plate 13 to the lens 10. It will thus be understood that the path traversed by the traction wheel 8 will always equal the length of plate exposed and images projected upon the sensitized plate within the camera box will therefore always remain stationary upon the surface of said plate if the traction wheel is made to travel a circular path the radius of which is equal to the distance between the plate and the center of the lens. In order that this adjustment may be easily made, a scale may be placed on the rods supporting the end of the bellows in which the lens is mounted and another on the shaft 5 by which the traction wheel 8 can be adjusted to correspond with any focal distance.

The pivot 6 supporting the camera is provided with two joints X and Y operating preferably at right angles to each other. The joint X is provided with a thumb screw or other suitable means by which the joint may be secured or set, after moving the camera to any desired angle relative to the horizon, as shown in Fig. 3. The center of the joint X being coincident with the center of the shaft 5, it will be observed that in all positions to which the camera may be adjusted, the traction wheel 8 will always be in contact with the base 7. The joint Y, is left free and permits the camera to be tilted into the position shown in Fig. 4, thus enabling the operator to take the traction wheel 8 out of contact with the base 7 and revolve the camera to any position from which it is desired to start a picture. The weight of the motor box 4 is such as to unbalance the camera, making the greater weight always fall upon its side thus giving traction to the wheel 8.

The operation of the apparatus is as follows: Assuming that the motor mechanism is wound up or in condition for action, the operator raises the camera box into the position shown in Fig. 4 and revolves it so as to include the first portion of the scene to be pictured. The operator then adjusts the base preferably so that its upper face is level and if he be on an eminence and desires to photograph objects below him, he adjusts the joint X so that the camera points down at the desired angle as shown in Fig. 3, or if he be in a depression and desires to photograph objects above him he adjusts the joint X so that the camera points up and after adjusting the camera to the desired angle relative to the horizon he secures the joint in that position. The operator will then adjust the lens in proper focal position and will adjust the wheel 8 to a position on the shaft 5 equal in distance from the center of the pivot 6, to the distance from the surface of the sensitized plate to the center of the lens. He will then release the motor or driving mechanism, whereupon the lens will be traversed across the sensitized plate and the camera will be caused to sweep across the horizon, thus regularly and uniformly, successively or progressively exposing sections of the plate in correspondence with the angular displacements of the camera relatively to the horizon.

It is to be particularly noted that the linear motion of the camera obscura across the sensitized plate is regular and uniform with the speed of the motor and that by means of the traction wheel 8 the rotation of the camera at any desired speed is accomplished. The angular motion of the camera is made to vary in due proportion to the focal length of the lens used so that the motion may be adjusted to permit the use in the same apparatus of lenses of varying focal lengths.

It will be understood that the traction wheel 8 may be made any diameter relative to that of the drum 2 and that by making the scales proportionate, the same result will be accomplished as when both are the same diameters.

What I claim is:

1. In a panoramic photographic apparatus, the combination of a rotating plate holder, a lens supported by and arranged to travel on said plate holder, and means for rotating the plate holder and moving the lens thereon at speeds having a predetermined relation.

2. In a panoramic photographic apparatus, the combination of a rotating plate holder, a lens supported by and arranged to travel on said plate holder, means for rotating the plate holder and moving the lens thereon, and means for varying the speed of movement of the plate holder relative to the movement of the lens.

3. In a panoramic photographic apparatus, the combination of a rotating plate holder, a curtain mounted on said plate holder, a lens carried by the plate holder and arranged to travel with the curtain, and means for rotating the plate holder and moving the curtain and lens thereon at regulated speeds having a predetermined relation.

4. In a panoramic photographic apparatus, the combination with a base, of a plate holder pivotally supported on said base, a lens supported by and arranged to travel on said plate holder, and means for inclining said plate holder from its normal position in a vertical plane to direct the lens upward or downward from a horizontal plane.

5. In a panoramic photographic apparatus, the combination of a base, a plate holder arranged to rotate about a pivotal point on said base, a lens supported by and arranged to travel on said plate holder, a motor for moving the lens a traction wheel arranged to travel in a circular path on said base about the pivot of the plate holder, and connections between said traction wheel and the motor whereby the speed of angular movement of the lens is governed by the position of the traction wheel.

6. In a panoramic photographic apparatus, the combination of a base, a plate holder arranged to rotate about an axis on said base, a lens supported by and arranged to travel on said plate holder, a traction wheel adapted to travel on the base in a circular path about the axis of the plate holder, a motor, connections between said traction wheel and motor whereby the angular speed of the latter is governed by the position of the traction wheel, and means for adjusting the traction wheel to and from the motor.

7. In a panoramic photographic apparatus, the combination of a rotating plate holder, a base upon which said holder is pivotally supported, a lens supported by and arranged to travel on said plate holder, a traction wheel adapted to travel in a circular path upon the base, a motor, connections between the motor and the traction wheel whereby the angular speed of the lens is governed by the traction wheel, means for adjusting the lens relatively to the plate holder, and means for adjusting the traction wheel to vary the radius of its path.

8. In a panoramic photographic apparatus, the combination of a base, a vertical pivot on said base, a plate holder having a hinge connection with said pivot whereby it may be tipped endwise in its own plane, a lens supported by and arranged to travel on said plate holder, a traction wheel supported in bearings on the plate holder and adapted to run on the base in a circular path about the pivot, connections between said lens and the traction wheel whereby the angular speed of the lens is governed by the position of the traction wheel, and a motor carried by the plate holder and arranged to rotate said plate holder and cause the lens to travel thereon simultaneously.

9. In a panoramic photographic apparatus, the combination of a base, a plate holder pivotally supported on said base, a shaft mounted in bearings on the plate holder, a traction wheel traveling on the base and adjustable on said shaft to and from the pivot of the plate holder, a roller arranged in the plate holder and connected with said shaft by suitable gearing, a flexible curtain for the plate holder passing around said roller, a lens connected to said curtain and adapted to travel on said plate holder, a motor for driving said mechanism, and a connection between said motor and the traction wheel shaft whereby the plate holder is given an angular movement and the travel of the lens thereon is controlled relatively to the speed of rotation of the plate holder.

10. In a panoramic photographic apparatus, the combination of a rotating plate-holder, a curtain mounted on said plate-holder, a lens carried by the plate-holder and arranged to travel with the curtain and means for rotating the plate-holder and moving the curtain and lens thereon at regulated speeds having a predetermined relation.

11. In a panoramic photographic apparatus, the combination of a rotating plate-holder, the curtain mounted on said plate-holder, a lens carried by the plate-holder, means for adjusting the lens vertically with respect to said plate-holder, said lens being arranged to travel with the curtain and means for rotating the plate-holder and moving the curtain and lens thereon at regulated speeds, having a predetermined relation to each other.

12. In a panoramic photographic apparatus, the combination of a rotating plate holder, a lens supported by and arranged to travel on said plate holder, and means for rotating the plate holder and moving the lens thereon at speeds having a fixed relation.

13. In a panoramic photographic apparatus, the combination of a base, a plate holder, a lens supported by and arranged to travel on said plate holder, means for rotating the plate holder at a regulated speed, and means for moving the lens simultaneously on the plate holder at a speed having a fixed relation to the speed of rotation of said holder.

14. In a panoramic photographic apparatus, the combination of a rotating plate holder, a curtain mounted on said plate holder and provided with an exposure slit, a lens carried by the plate holder and arranged to travel with the curtain, and means for rotating the plate holder and moving the curtain and lens thereon at regulated speeds having a fixed relation.

15. In a panoramic photographic apparatus, the combination with a base, of a plate holder pivotally supported on said base, a lens supported by and arranged to travel on said plate holder, a motor and a common mechanism driven by the motor for rotating the plate holder and moving the lens.

16. In a panoramic photographic apparatus, the combination of a base, a plate holder pivotally mounted on the base, a gear fixed on said base, a flexible curtain and lens arranged to travel on the plate holder, a roller for driving said curtain, mechanical connection between the fixed gear and the roller whereby a fixed relation is established between the rotation of the plate holder and the movement of the curtain and lens and a motor for moving said parts.

17. In a panoramic photographic apparatus, an elongated plate holder having a central plate holding compartment, a curtain arranged to travel on said plate holder and provided with an exposure slit or opening, and means for moving the curtain to carry its opening across the plate holding compartment and beyond said compartment, the light being shut off when the opening passes beyond the compartment.

18. In a panoramic photographic apparatus, a plate holder having a central plate holding compartment, end compartments separated from said central compartment by light proof partitions, rollers mounted in said end compartments, a flexible curtain mounted on said rollers and having an opening adapted to travel across the plate compartment and past the partitions at each end thereof, and a lens carried by said curtain.

19. In a panoramic photographic apparatus, the combination of a plate holder having a central plate holding compartment, rollers mounted in the ends of said plate holder, a flexible curtain extending about the rollers, a plate 14 connected to the curtain and provided with an exposure opening, rollers carried by said plate and adapted to run in suitable ways upon the plate holder, a lens also carried by said plate, and means for rotating the plate holder and causing the lens to travel thereon, for the purpose set forth.

20. In a photographic apparatus, the combination with a base, of a plate holder pivotally supported on said base, a lens supported by and arranged to travel on said plate holder, a motor, mechanism driven by the motor for rotating the plate holder and moving the lens, and a movable stop arranged to prevent action of the motor until it is desired to operate the apparatus, for the purpose set forth.

21. In a panoramic photographic apparatus, the combination of a movable plate holder, the lens carried by the plate holder and adapted to travel across the face of said plate holder, and means for moving the plate holder and for moving the lens.

22. In a panoramic photographic apparatus the combination of a movable plate holder, a lens and a lens support with means for causing the lens and its support to partake in part of the movement of the plate holder, and means for imparting to said lens an independent movement of its own.

23. In a panoramic photographic apparatus the combination of a movable plate holder, means for holding said movable plate holder, a lens and a support therefor with means for causing said lens and its support to move longitudinally on said plate holder, and means for causing the lens and lens holder to partake in part of the rotary movement of said movable plate holder, means for stopping the movement of said lens and its holder, and means for controlling the speed of said longitudinal traveling means.

24. In an apparatus of the character described a panoramic photographic plate holder, a pivotal support therefor, a lens, a holder for said lens, means for longitudinally actuating said lens and its holder, means for controlling the speed of said longitudinally actuating means and means for starting and stopping said longitudinally actuating means.

25. In a panoramic photographic apparatus the combination of a movable plate holder, a lens adapted to travel across the face of said plate holder and means for giving the plate holder a rotary movement and the lens a longitudinal movement across the plate holder.

26. In a panoramic photographic apparatus the combination of a movable plate holder, a lens adapted to travel across the face of said plate holder and means for giving the plate holder a rotary movement and the lens a longitudinal movement across the plate holder, the longitudinal movement of said lens having a fixed relation to the rotary movement of the plate holder.

WILLIAM VERBECK.

Witnesses:
G. MacAvoy,
R. Galbraeth.